US011975554B2

(12) United States Patent
Matsui

(10) Patent No.: US 11,975,554 B2
(45) Date of Patent: May 7, 2024

(54) THERMAL TRANSFER SHEET

(71) Applicant: Dai Nippon Printing Co., Ltd., Tokyo (JP)

(72) Inventor: Hiroto Matsui, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 325 days.

(21) Appl. No.: 17/593,872

(22) PCT Filed: Mar. 25, 2020

(86) PCT No.: PCT/JP2020/013380

§ 371 (c)(1),
(2) Date: Sep. 27, 2021

(87) PCT Pub. No.: WO2020/203566

PCT Pub. Date: Oct. 8, 2020

(65) Prior Publication Data

US 2022/0144001 A1 May 12, 2022

(30) Foreign Application Priority Data

Apr. 4, 2019 (JP) ................................ 2019-072338

(51) Int. Cl.
*B41M 5/44* (2006.01)

(52) U.S. Cl.
CPC ......... *B41M 5/443* (2013.01); *B41M 2205/02* (2013.01); *B41M 2205/36* (2013.01); *B41M 2205/38* (2013.01)

(58) Field of Classification Search
CPC .... B41M 5/44; B41M 5/443; B41M 2205/02; B41M 2205/06; B41M 2205/36; B41M 2205/38
See application file for complete search history.

(56) References Cited

U.S. PATENT DOCUMENTS

| | | | |
|---|---|---|---|
| 4,735,860 | A | 4/1988 | Mizobuchi et al. |
| 5,143,782 | A | 9/1992 | Morishima et al. |
| 5,569,540 | A | 10/1996 | Hirose et al. |
| 6,737,152 | B2 | 5/2004 | Suzuki et al. |

(Continued)

FOREIGN PATENT DOCUMENTS

| | | | |
|---|---|---|---|
| EP | 2 762 323 | A1 | 8/2014 |
| JP | H01-218887 | A | 9/1989 |

(Continued)

OTHER PUBLICATIONS

U.S. Appl. No. 16/972,745, filed Dec. 7, 2020, Matsui, Hiroto.

(Continued)

*Primary Examiner* — Gerard Higgins
(74) *Attorney, Agent, or Firm* — BURR PATENT LAW, PLLC

(57) ABSTRACT

Provided is a thermal transfer sheet enabling printing suitability on high temperature printing to be good. A thermal transfer sheet 100 in which either one or both of a colorant layer 3 and a transfer layer 10 are provided on one face of a substrate 1, and a back face layer 20 is provided on the other face of the substrate 1, wherein a back face primer layer 25 is provided between the substrate 1 and the back face layer 20, and the back face primer layer 25 contains at least one component selected from a silicone resin, a siloxane cross-linked resin, and a silica-introduced resin.

1 Claim, 1 Drawing Sheet

(56) References Cited

U.S. PATENT DOCUMENTS

| | | | |
|---|---|---|---|
| 2009/0165938 A1 | 7/2009 | Muro et al. |
| 2010/0196631 A1 | 8/2010 | Sawada |
| 2012/0189787 A1 | 7/2012 | Sawada |
| 2013/0330488 A1 | 12/2013 | Imakura et al. |
| 2014/0212604 A1 | 7/2014 | Suzuki et al. |

FOREIGN PATENT DOCUMENTS

| | | |
|---|---|---|
| JP | H03-065396 A | 3/1991 |
| JP | H04-329194 A | 11/1992 |
| JP | H06-055861 A | 3/1994 |
| JP | H06-099670 A | 4/1994 |
| JP | H07-096682 A | 4/1995 |
| JP | H08-150787 A | 6/1996 |
| JP | H09-001942 A | 1/1997 |
| JP | H09-123624 A | 5/1997 |
| JP | H09-123625 A | 5/1997 |
| JP | H11-335425 A | 12/1999 |
| JP | 2000-079768 A | 3/2000 |
| JP | 2000-103178 A | 4/2000 |
| JP | 2000-272254 A | 10/2000 |
| JP | 2000-326641 A | 11/2000 |
| JP | 2001-328359 A | 11/2001 |
| JP | 2002-240404 A | 8/2002 |
| JP | 2005-262690 A | 9/2005 |
| JP | 2007-098696 A | 4/2007 |
| JP | 2007-307764 A | 11/2007 |
| JP | 2009-073102 A | 4/2009 |
| JP | 2009-173024 A | 8/2009 |
| JP | 2009-274428 A | 11/2009 |
| JP | 2010-052364 A | 3/2010 |
| JP | 2011-201092 A | 10/2011 |
| JP | 2012-153020 A | 8/2012 |
| JP | 2012-187924 A | 10/2012 |
| JP | 2013-010312 A | 1/2013 |
| JP | 2013-082210 A | 5/2013 |
| JP | 2014-188894 A | 10/2014 |
| JP | 2016-165844 A | 9/2016 |
| JP | 2017-052141 A | 3/2017 |

OTHER PUBLICATIONS

U.S. Appl. No. 17/275,711, filed Mar. 12, 2021, Matsui, Hiroto.

International Search Report and Written Opinion (Application No. PCT/JP2020/013380) dated Jun. 23, 2020.

Related International Search Report and Written Opinion (Application No. PCT/JP2019/025679) dated Sep. 10, 2019.

Related International Search Report and Written Opinion (Application No. PCT/JP2019/037832) dated Dec. 10, 2019.

Related Extended European Search Report (Application No. 19826490.5) dated Jul. 19, 2021.

THERMAL TRANSFER SHEET

TECHNICAL FIELD

The present disclosure relates to a thermal transfer sheet.

BACKGROUND ART

As a thermal transfer sheet, there is known a thermal transfer sheet in which a colorant layer or a transfer layer is provided on one face of a substrate (see Patent Literature 1). According to such a thermal transfer sheet, it is possible to produce a print in which a thermal transferred image is formed on a transfer receiving article or a print in which a transfer layer is transferred onto a transfer receiving article by applying energy to the thermal transfer sheet with a heating device such as a thermal head in a printer.

The market is now highly demanding speed-up on producing prints. Thus, higher energy is applied on a thermal transfer sheet per unit time in a printer. When energy applied on a thermal transfer sheet is increased, when the thermal transfer sheet is used for producing a print, elongation is likely to occur in a constituent member of the thermal transfer sheet, for example, the substrate of the thermal transfer sheet. When elongation occurs in a constituent member of the thermal transfer sheet, a wrinkle or the like is likely to occur in a print to be produced using the thermal transfer sheet due to the elongation.

Under such circumstances, attempts of providing a back face layer on the other face of the substrate and imparting heat resistance to this back face layer, and the like have been made. However, these measures have not sufficiently suppressed elongation of a constituent member of the thermal transfer sheet, and there is a room for improvement of printing suitability on producing a print with higher energy. Hereinafter, printing suitability on producing a print with higher energy may be referred to as printing suitability on high temperature printing.

CITATION LIST

Patent Literature

Patent Literature 1: Japanese Patent Laid-Open No. 2009-173024

SUMMARY OF INVENTION

Technical Problem

The present disclosure aims principally to provide a thermal transfer sheet having good printing suitability on high temperature printing.

Solution to Problem

A thermal transfer sheet according to an embodiment of the present disclosure is a thermal transfer sheet in which either one or both of a colorant layer and a transfer layer are provided on one face of a substrate, and a back face layer is provided on the other face of the substrate, wherein a back face primer layer is provided between the substrate and the back face layer, and the back face primer layer contains at least one component selected from a silicone resin, a siloxane cross-linked resin, and a silica-introduced resin.

A thermal transfer sheet according to an embodiment of the present disclosure is a thermal transfer sheet in which either one or both of a colorant layer and a transfer layer are provided on one face of a substrate, and a back face layer is provided on the other face of the substrate, wherein a back face primer layer is provided between the substrate and the back face layer, and the back face primer layer has a storage elastic modulus G' at 200° C. of $1.0\times10^7$ Pa or more.

The thermal transfer sheet of the present disclosure has good printing suitability on high temperature printing.

DESCRIPTION OF EMBODIMENTS

Figure 1:
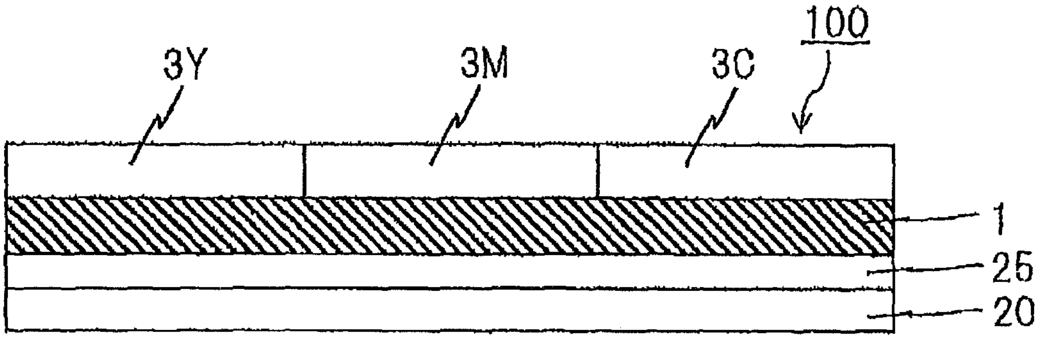
FIG. 1 is a schematic cross-sectional view showing an exemplary thermal transfer sheet of the present disclosure.

Hereinafter, embodiments of the thermal transfer sheet of the present disclosure will be described with reference to the drawings. The present disclosure may be embodied in many different aspects and should not be construed as being limited to the description of the exemplary embodiments below. In the drawings, components may be shown schematically regarding the width, thickness, shape and the like, compared with actual aspects, for the sake of clearer illustration. The schematic drawings are merely examples and do not limit the interpretations of the present disclosure in any way. In the specification and the drawings, components that have substantially the same functions as those described before with reference to previous drawings bear the identical reference signs thereto, and detailed descriptions thereof may be omitted. For convenience of explanation, the term such as upward or downward is used to explain, but the upward and downward directions may be reversed. The same applies to the right and left directions.

<<Thermal Transfer Sheet>>

Hereinafter, a thermal transfer sheet according to an embodiment of the present disclosure (hereinafter, referred to as the thermal transfer sheet of the present disclosure) will be described.

In a thermal transfer sheet 100 of the present disclosure, either one or both of a colorant layer 3 and a transfer layer 10 are provided on one face of a substrate 1. In the thermal transfer sheet 100 of the present disclosure, a back face layer 20 is provided on the other face of the substrate 1. In the thermal transfer sheet 100 of the present disclosure, a back face primer layer 25 is provided between the substrate 1 and the back face layer 20.

Figure 2:
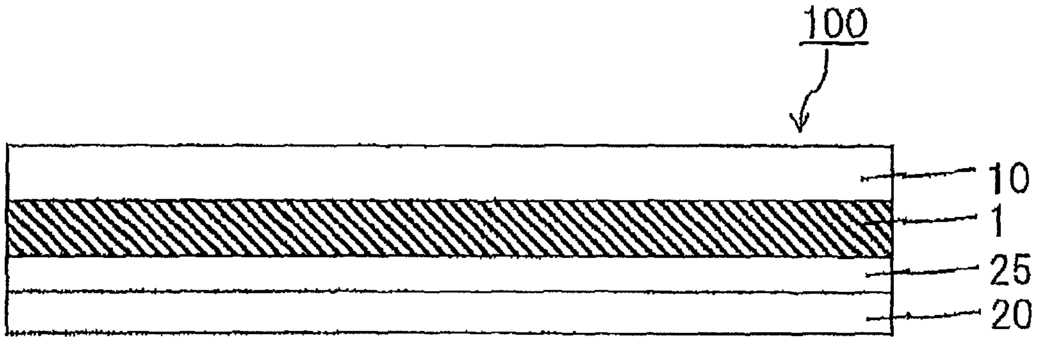
FIG. 2 is a schematic cross-sectional view showing an exemplary thermal transfer sheet of the present disclosure.
Figure 3:
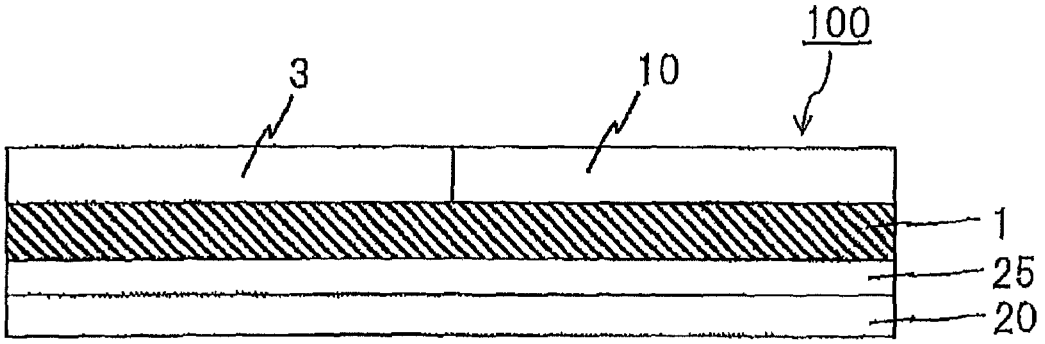
FIG. 3 is a schematic cross-sectional view showing an exemplary thermal transfer sheet of the present disclosure.

FIGS. 1 to 3 are schematic cross-sectional views each showing an exemplary thermal transfer sheet 100 of the present disclosure.

An exemplary thermal transfer sheet 100 of the present disclosure, a plurality of colorant layers 3 is provided in a frame-sequential manner on one face of the substrate 1. An exemplary thermal transfer sheet 100 of the present disclosure, a yellow colorant layer 3Y, a magenta colorant layer 3M, and a cyan colorant layer 3C are provided in a frame-sequential manner on one face of the substrate 1 (see FIG. 1).

An exemplary thermal transfer sheet 100 of the present disclosure, a transfer layer 10 having a single-layer structure or a layered structure is provided on one face of substrate 1 (see FIG. 2).

An exemplary thermal transfer sheet 100 of the present disclosure, a colorant layer 3 and a transfer layer 10 are provided in a frame-sequential manner on one face of the substrate 1 (see FIG. 3).

In the thermal transfer sheet 100 of the present disclosure, the embodiments shown in the figures may be combined.

(Substrate)

The substrate 1 retains various constituent members to be provided on one face and the other face of the substrate 1.

Examples of the substrate include various films, various sheets, and various cards.

There is no limitation on the material of the substrate 1, and examples thereof may include polyesters such as polyethylene terephthalate, polyarylate, polycarbonate, polyurethane, polyimides, polyetherimides, cellulose derivatives, polyethylene, ethylene-vinyl acetate copolymers, polypropylene, polystyrene, acryl, polyvinyl chloride, polyvinylidene chloride, polyvinyl alcohol, polyvinyl butyral, nylon, polyether ether ketone, polysulfone, polyethersulfone, tetrafluoroethylene-perfluoroalkyl vinyl ether copolymers, polyvinyl fluoride, tetrafluoroethylene-ethylene copolymers, tetrafluoroethylene-hexafluoropropylene copolymers, polychlorotrifluoroethylene, and polyvinylidene fluoride.

There is no limitation on the thickness of the substrate 1, and the thickness thereof is usually 2.5 μm or more and 100 μm or less.

One or both of the faces of the substrate 1 may be surface-treated. Examples of a method for surface treatment may include corona discharge treatment, flame treatment, ozone treatment, ultraviolet treatment, radiation treatment, roughening treatment, chemical treatment, plasma treatment, low-temperature plasma treatment, primer treatment, and grafting treatment. The surface treatment includes a treatment layer for treating the surface of the substrate 1. For example, primer treatment includes providing a primer layer.

(Back Face Layer)

The back face layer 20 is provided on the other face side of the substrate 1.

There is no limitation on components of the back face layer, and examples thereof may include resin components including polyesters, acrylic resins, polyvinyl acetate, styrene-acryl copolymers, polyurethane, polyolefins such as polyethylene and polypropylene, polystyrene, polyvinyl chloride, polyethers, polyamides, polyimides, polyamideimides, polycarbonate, polyacrylamide, polyvinyl chloride, polyvinyl acetals such as polyvinyl acetoacetal and polyvinyl butyral, and silicone-modified forms of these. Components other than these may be used.

The resin component may be cross-linked with a cross-linking agent. Examples of the cross-linking agent include isocyanate-type cross-linking agents. In the present disclosure, cross-linking may be replaced by curing.

An exemplary back face layer contains a lubricant, particles, or the like. A back face layer containing a lubricant, particles, or the like has good lubricity.

Examples of the lubricant may include silicone oils, polyethylene wax, paraffin wax, higher fatty acid esters, higher fatty acid amides, higher aliphatic alcohols, organopolysiloxane, anionic surfactants, cationic surfactants, amphoteric surfactants, nonionic surfactants, fluorine type surfactants, organic carboxylic acids and derivatives thereof, and metal soaps.

Examples of the particles may include organic particles and inorganic particles.

Examples of the organic particles may include silicone particles, fluorine particles, acryl particles, nylon particles, PTFE (polytetrafluoroethylene) particles, butadiene rubber particles, melamine particles, and styrene particles. Silicone particles may be referred to as silicone resin particles.

Examples of the inorganic particles include talc.

Exemplary particles are a filler.

Lubricants and particles other than these may be used.

The back face layer may contain components and the like of the back face primer layer 25.

There is no limitation on a method for forming the back face layer 20, and the back face layer may be formed by dispersing or dissolving the components of the back face layer in an appropriate solvent to prepare a coating liquid for back face layer, coating this coating liquid, and drying the coated liquid. Examples of the coating method may include a gravure printing method, a screen printing method, and a reverse coating method using a gravure printing plate. A coating method other than these may be used. The same applies to coating methods for various coating liquids mentioned below.

(Back Face Primer Layer)

In the thermal transfer sheet 100 of the present disclosure, a back face primer layer 25 is provided between the substrate 1 and the back face layer 20.

Hereinafter, with printing suitability when a print is produced using a common thermal transfer sheet in which a conventionally known back face primer layer is provided between the substrate and the back face layer is used taken as an example, advantages of the thermal transfer sheet of the present disclosure will be described.

The printing suitability in the present disclosure is an index indicating the degree of suppression of a printing wrinkle and printing unevenness. A printing wrinkle and printing unevenness occur due to elongation of a constituent member of the thermal transfer sheet. In the present disclosure, a case where printing suitability is good means capability of producing a print in which a printing wrinkle and printing unevenness are suppressed.

A print is produced by bringing the back face layer of the thermal transfer sheet into contact with a heating device and moving the heating device on which energy is applied so as to be rubbed on the back face layer. Predetermined energy is applied to the back face layer by the heating device. Examples of the heating device may include thermal heads.

On high temperature printing, high energy is applied on the back face layer of the thermal transfer sheet from a heating device. High-speed printing is conducted for the purpose of formation of a thermal transferred image having a high density and speed-up of print production, for example.

When the back face primer layer has low heat resistance, the back face primer layer is melted and softened on high temperature printing, and loosening occurs in the back face primer layer. Loosening occurring in the back face primer layer may be responsible for generating a wrinkle in the back face layer. A Wrinkle occurring in the back face layer may be responsible for generating a printing wrinkle in a thermal transferred image to be formed or a transfer layer to be transferred.

When a wrinkle occurs in the back face layer, a portion of the back face layer is scraped off by a heating device such as a thermal head, and shavings of the back face layer are likely to adhere to the heating device. Adherence of shavings of the back face layer to the heating device degrades the performance of the heating device to thereby prevent high temperature printing.

Depending on the extent of loosening of the back face primer layer, breakage of the back face layer or breakage of the substrate may be caused, and in some cases, printing failures may occur.

Loosening of the back face primer layer is also relevant to the adhesion of the back face primer layer. When the adhesion between the substrate and the back face layer on high temperature printing is low, loosening occurs in the back face primer layer to be responsible for reduction in the printing suitability on high temperature printing.

In order to make the printing suitability on high temperature printing good, it is required that the back face primer layer be not melted and softened on high temperature printing and the adhesion between the substrate and the back face layer on high temperature printing be capable of being maintained in a good condition.

In the thermal transfer sheet 100 of the present disclosure, the back face primer layer 25 satisfies either one or both of the requirements of a first embodiment and a second embodiment below.

(Back Face Primer Layer of First Embodiment)

A back face primer layer 25 of a first embodiment contains at least one selected from Group A, which is a group of a silicone resin, a siloxane cross-linked resin, and a silica-introduced resin.

The components of Group A have good heat resistance.

The components of Group A have good adhesion, and the back face primer layer 25 of the first embodiment containing the components of Group A, which can maintain this good adhesion even when subjected to application of high energy, can suppress occurrence of loosening on high temperature printing by its good heat resistance and good adhesion. The thermal transfer sheet of the present disclosure comprising the back face primer layer 25 of the first embodiment has good printing suitability on high temperature printing.

(Silicone Resin)

A silicone resin in the present disclosure means a resin composed by siloxane bonds.

Examples of the silicone resin may include (i) a methyl silicone resin in which an organic substituent(s) is (are) substituted with a methyl group, (ii) a methylphenyl silicone resin in which an organic substituent(s) is (are)substituted with a methyl group and a phenyl group, and (iii) an organic resin-modified silicone resin which is modified with various organic resins.

Examples of the organic resin-modified silicone resin may include an epoxy resin-modified silicone resin, an alkyd resin-modified silicone resin, and a polyester-modified silicone resin.

The back face primer layer 25 of the first embodiment preferably contains a cross-linked silicone resin. A cross-linked silicone resin may be referred to as a cured silicone resin.

In the present disclosure, a cross-linked silicone resin means a resin obtained by cross-linking various silicone resins.

Examples of the cross-linked silicone resin may include (i) a cross-linked silicone resin obtained by cross-linking a silicone resin having a silanol group in a dehydrative condensation reaction, (ii) a cross-linked silicone resin obtained by cross-linking a silicone resin having a functional group(s) such as an alkoxysilyl group(s) in a dealcoholization condensation reaction, and (iii) a cross-linked silicone resin obtained by cross-linking a silicone resin(s) having a vinyl group(s) and a hydrosilyl group(s) in an addition reaction via hydrosilylation using a platinum catalyst or the like.

(Siloxane Cross-Linked Resin)

In the present disclosure, a siloxane cross-linked resin means a cross-linked resin obtained by cross-linking an alkoxysilyl group-containing resin.

Examples of the siloxane cross-linked resin may include a resin in which a "Si—O—Si" cross-linked structure is formed by hydrolysis of an alkoxysilyl group of an alkoxysilyl group-containing resin and a silanol reaction.

Examples of basic constitutional units of a silicon polymer forming the "Si—O—Si" cross-linked structure may include the following M unit, D unit, T unit, and Q unit. "R" in each unit is an organic substituent.

Among these, a siloxane cross-linked resin including the T unit as the basic constitutional unit of a silicon polymer has a three-dimensional cross-linked structure to thereby enable the strength of a layer containing the siloxane cross-linked resin to be further enhanced.

[Formula 1]

M unit

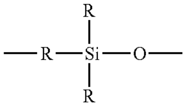

D unit

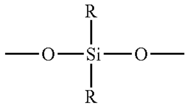

T unit

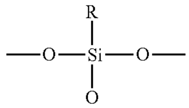

Q unit

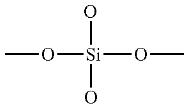

Examples of an alkoxysilyl group-containing resin may include alkoxysilyl group-containing acrylic resins, alkoxysilyl group-containing polyesters, alkoxysilyl group-containing epoxy resins, alkoxysilyl group-containing alkyd resins, alkoxysilyl group-containing fluorine resins, alkoxysilyl group-containing polyurethane, alkoxysilyl group-containing phenol resins, alkoxysilyl group-containing melamine resins, silicone resins, and silicone oligomers.

Examples of the alkoxysilyl group may include a trialkoxysilyl group, a dimethoxysilyl group, and a monoalkoxysilyl group.

In the present disclosure, an alkoxysilyl group-containing resin includes a resin including an alkoxysilyl group introduced and an alkoxysilyl group-modified resin.

Examples of a siloxane cross-linked resin to be obtained from an alkoxysilyl group-containing resin may include siloxane cross-linked acrylic resins, siloxane cross-linked polyesters, siloxane cross-linked epoxy resins, siloxane cross-linked alkyd resins, siloxane cross-linked fluorine resins, siloxane cross-linked polyurethane, siloxane cross-linked phenol resins, and siloxane cross-linked melamine resins.

A preferable back face primer layer 25 of the first embodiment contains a siloxane cross-linked acrylic resin.

Examples of the form of the siloxane cross-linked acrylic resin include (i) a form in which alkoxysilyl groups possessed by one acrylic resin main chain are cross-linked, (ii)

a form in which an alkoxysilyl group possessed by one acrylic resin main chain and an alkoxysilyl group possessed by another acrylic resin main chain are cross-linked, and a form in which (i) and (ii) are combined.

The siloxane cross-linked resin may be one obtained by cross-linking an alkoxysilyl group-containing resin by a cross-linking agent.

A cross-linking agent may be appropriately selected in accordance with the alkoxysilyl group-containing resin.

When an alkoxysilyl group-containing acrylic resin is used, examples of the cross-linking agent may include a zirconia-type cross-linking agent, an aluminum-type cross-linking agent, a titanium-type cross-linking agent, and a tin-type cross-linking agent.

There is no limitation on the content of the cross-linking agent, and the content thereof is 0.01% by mass or more and 20% by mass or less based on the total mass of the resin composition for forming a layer containing the siloxane cross-linked resin.

(Silica-Introduced Resin)

In the present disclosure, silica-introduced resins mean various resins including silica introduced into their structure. A silica-introduced resin may be referred to as an inorganic-organic hybrid resin.

Examples of the silica-introduced resin include silica-introduced epoxy resins, silica-introduced polyamideimide, silica-introduced polyimide, and silica-introduced polyurethane. A preferable back face primer layer 25 of the first embodiment contains a silica-introduced epoxy resin.

There is no limitation on the content of the component of Group A in the total mass of the back face primer layer 25 of the first embodiment. In comparison with a back face primer layer containing no component of Group A regardless of the content, the heat resistance of the back face primer layer can be enhanced, and the printing suitability is good.

A preferable back face primer layer 25 of the first embodiment contains 50% by mass or more of and more preferably contains 60% by mass or more of the component of Group A based on the total mass of the back face primer layer 25 of the first embodiment.

The back face primer layer 25 of the first embodiment may contain other components along with the component of Group A described above.

Examples of other components may include polyesters, polyurethane, acrylic resin, polycarbonate, polyamides, polyimides, polyamideimides, vinyl chloride-vinyl acetate copolymers, polyvinyl butyral, polyvinyl alcohol, polyvinyl pyrrolidone, sulfonated polyanilines, polymers containing quaternary ammonium salts, various surfactants, carbon particles, silver particles, and gold particles. The same applies to a back face primer layer 25 of a second embodiment described below.

There is no limitation on a method for forming the back face primer layer 25 of the first embodiment, and the back face primer layer 25 can be formed by dissolving or dispersing the component of Group A described above and the like in an appropriate solvent to prepare a coating liquid for back face primer layer, coating this coating liquid, and drying the coated liquid.

(Back Face Primer Layer of Second Embodiment)

The back face primer layer 25 of the second embodiment has a storage elastic modulus G' at 200° C. of $1.0\times10^7$ Pa or more.

The back face primer layer 25 of the second embodiment can suppress occurrence of loosening in the back face primer layer 25 on high temperature printing. The thermal transfer sheet of the present disclosure comprising the back face primer layer 25 of the second embodiment has good printing suitability on high temperature printing.

As described above, loosening of the back face primer layer 25 is relevant to the adhesion of the back face primer layer. The back face primer layer 25 of the second embodiment capable of suppressing occurrence of loosening on high temperature printing can maintain the adhesion between the substrate 1 and the back face layer 20 in a good condition on high temperature printing.

(Method for Measuring Storage Elastic Modulus G')

In the present disclosure, a storage elastic modulus G' is a value determined using a dynamic viscoelastic measurement apparatus in accordance with JIS-K-7244-6 (1999).

As the dynamic viscoelastic measurement apparatus, an ARES dynamic viscoelastic measurement device (Advanced Rheometric Expansion System) manufactured by TA Instruments Japan Inc. is used.

The measurement conditions include parallel plate: 10 mm in diameter, strain: 1%, amplitude (frequency): 1 Hz, temperature elevation rate: 2° C./min, and measurement temperature: temperature raised from 30° C. to 300° C., and the storage elastic modulus G' at 200° C. is determined. For the measurement, a specimen formed by coating a coating liquid including the components of the back face primer and drying the coated liquid is used.

There is no limitation on the components contained in the back face primer layer 25 of the second embodiment, and it is only required to appropriately select components that enable the storage elastic modulus G' at 200° C. to be $1.0\times10^7$ Pa or more. The storage elastic modulus G' may be adjusted with one component or with two or more components.

An exemplary back face primer layer 25 of the second embodiment contains a silicon-containing resin. Appropriately adjusting the content and the like of the silicon-containing resin easily enables the storage elastic modulus G' of the back face primer layer 25 to be $1.0\times10^7$ Pa or more.

Examples of the silicon-containing resin may include polysiloxane, silicone-modified products of various resins, and the components of Group A described above. The silicon-containing resins include cross-linked products of the silicon-containing resins. Among these silicon-containing resins, the components of Group A described above are preferable because the components enable the storage elastic modulus G' at 200° C. of the back face primer layer 25 to be $1.0\times10^7$ Pa or more without use of other components and the like.

There is no limitation on the content of the components contained in the back face primer layer 25 of the second embodiment, and the content is only required to enable the storage elastic modulus G' at 200° C. to be $1.0\times10^7$ Pa or more.

There is no limitation on a method for forming the back face primer layer 25 of the second embodiment, and the back face primer layer 25 can be formed by dispersing or dissolving various components that enable the storage elastic modulus G' at 200° C. to be $1.0\times10^7$ Pa or more, for example, various components exemplified as above, in an appropriate solvent to prepare a coating liquid for back face primer layer, coating this coating liquid, and drying the coated liquid.

The thickness of the back face primer layer 25 of the first embodiment or the second embodiment is preferably 0.01 μm or more and 2 μm or less and more preferably 0.02 μm or more and 1 μm or less.

The thermal transfer sheet 100 of the present disclosure can be used for producing a print. For producing a print, a printer having a heating device or the like can be used.

Examples of a print to be produced include a print including a thermal transferred image formed on a transfer receiving article and a print including a transfer layer transferred onto a transfer receiving article.

The thermal transfer sheet 100 of the present disclosure comprises the back face primer layer 25 of the first embodiment or the second embodiment, which enables printing suitability on producing a print to be good. Thus, there is no limitation on the constituents other than the back face primer layer 25, and constituents conventionally known in the field of thermal transfer sheets can be appropriately selected and used.

An exemplary thermal transfer sheet 100 of the present disclosure has a colorant layer 3 for forming a thermal transferred image.

An exemplary thermal transfer sheet 100 of the present disclosure has a transfer layer 10 to be transferred onto a transfer receiving article.

Hereinafter, the colorant layer 3 and the transfer layer 10 will be described by way of an example, but the thermal transfer sheet 100 of the present disclosure is not limited to embodiments having the colorant layer 3 or the transfer layer 10.

(Colorant Layer)

FIGS. 1 and 3 are schematic cross-sectional views each showing an exemplary thermal transfer sheet 100 of the present disclosure. The thermal transfer sheet 100 of an embodiment shown in each of FIGS. 1 and 3 has a colorant layer(s) 3.

The thermal transfer sheet 100 of the present disclosure may be a thermal transfer sheet 100 to be used by a sublimation-type thermal transfer method or may be a thermal transfer sheet 100 to be used by a melt-type thermal transfer method.

The thermal transfer sheet 100 of the present disclosure is more suitable for use in the sublimation-type thermal transfer method, by which higher energy is likely to be applied, than for forming an image or for transferring a transfer layer 10 by the melt-type thermal transfer method.

(Examples of Colorant Layer that can be Used for Sublimation-Type Thermal Transfer Method)

A colorant layer 3 that can be used for the sublimation-type thermal transfer method contains a binder resin and a sublimable dye.

Example of the binder resin may include cellulosic resins, vinyl resins such as polyvinyl alcohol, polyvinyl acetate, polyvinyl butyral, polyvinyl acetoacetal, and polyvinyl pyrrolidone, acrylic resins such as poly(meth)acrylate and poly(meth)acrylamide, polyurethane, polyamides, and polyesters.

Examples of the cellulosic resin may include ethyl cellulose, hydroxyethyl cellulose, ethyl hydroxy cellulose, methyl cellulose, and cellulose acetate.

There is no limitation on the content of the binder resin, and the content of the binder resin based on the total mass of the colorant layer 3 is preferably 20% by mass or more. The colorant layer 3 of this embodiment can sufficiently retain a sublimable dye in the colorant layer 3 and has good preservability. There is no limitation on the upper limit of the content of the binder resin, and the upper limit is only required to be appropriately determined in accordance with the content of the sublimable dye and optional additives.

There is no limitation on the sublimable dye, and sublimable dyes that have a sufficient color density and do not discolor and fade due to light, heat, temperature, and the like are preferred.

Examples of the sublimable dye may include diarylmethane-type dyes, triarylmethane-type dyes, thiazole-type dyes, merocyanine dyes, pyrazolone dyes, methine-type dyes, indoaniline-type dyes, azomethine-type dyes such as acetophenoneazomethine, pyrazoloazomethine, imidazoleazomethine, imidazoazomethine, and pyridoneazomethine, xanthene-type dyes, oxazine-type dyes, cyanostyrene-type dyes such as dicyanostyrene and tricyanostyrene, thiazine-type dyes, azine-type dyes, acridine-type dyes, benzeneazo-type dyes, azo-type dyes such as pyridoneazo, thiopheneazo, isothiazoleazo, pyrroleazo, pyrrazoleazo, imidazoleazo, thiadiazoleazo, triazoleazo, and disazo, spiropyran-type dyes, indolinospiropyran-type dyes, fluoran-type dyes, rhodaminelactam-type dyes, naphthoquinone-type dyes, anthraquinone-type dyes, and quinophthalone-type dyes.

Specific examples thereof can include red dyes such as MS Red G (Mitsui Toatsu Kagaku Kabushiki Kaisha), Macrolex Red Violet R (Bayer AG), Ceres Red 7B (Bayer AG), and Samaron Red F3BS (Mitsubishi Chemical Corporation), yellow dyes such as Foron Brilliant Yellow 6GL (Clariant GmbH), PTY-52 (Mitsubishi Chemical Corporation), and Macrolex yellow 6G (Bayer AG), and blue dyes such as Kayaset® Blue 714 (NIPPON KAYAKU Co., Ltd.), Foron Brilliant Blue S-R (Clariant GmbH), MS Blue 100 (Mitsui Toatsu Kagaku Kabushiki Kaisha), and C.I. Solvent Blue 63.

The content of the sublimable dye is preferably 50% by mass or more and 350% by mass or less and more preferably 80% by mass or more and 300% by mass or less based on the total mass of the binder resin. The colorant layer 3 of this embodiment enables an image having a high density to be formed and has better preservability.

(Colorant Primer Layer)

A colorant primer layer (not shown) may be provided between the substrate 1 and the colorant layer 3 that can be used for the sublimation-type thermal transfer method. The colorant primer layer can make the adhesion between the substrate 1 and the colorant layer 3 good.

There is no limitation on the colorant primer layer, and a colorant primer layer conventionally known in the field of thermal transfer sheets can be appropriately selected and used.

An exemplary colorant primer layer is constituted by a resin component.

Examples of the resin component constituting the colorant primer layer may include polyesters, polyvinyl pyrrolidone, polyvinyl alcohol, polyacrylic esters, polyvinyl acetate, polyurethane, styrene acrylate, polyacrylamide, polyamides, polyvinyl acetoacetal, and polyvinyl butyral.

The colorant primer layer may also contain various additives. Examples of the additives may include organic particles and inorganic particles.

There is no limitation on a method for forming the colorant primer layer. The colorant primer layer can be formed by dispersing or dissolving the resin component and the like exemplified above in an appropriate solvent to prepare a coating liquid for colorant primer layer, coating this coating liquid, and drying the coated liquid. There is no limitation on the thickness of the colorant primer layer, and the thickness is generally 0.02 μm or more and 1 μm or less.

(Examples of Colorant Layer that can be Used for Melt-Type Thermal Transfer Method)

The colorant layer that can be used for the melt-type thermal transfer method contains a binder and a coloring agent.

Examples of the binder may include wax components and resin components.

Example of a wax component may include various waxes such as microcrystalline wax, carnauba wax, paraffin wax, Fischer-Tropsch wax, various low molecular weight polyethylenes, Japan wax, beeswax, spermaceti, Chinese wax, wool wax, shellac wax, candelilla wax, petrolactum, polyester wax, partially-modified wax, fatty acid esters, and fatty acid amides.

Example of a resin component may include ethylene-vinyl acetate copolymers, ethylene-acrylic acid ester copolymers, polyethylene, polystyrene, polypropylene, polybutene, petroleum resins, vinyl chloride resins, vinyl chloride-vinyl acetate copolymers, polyvinyl alcohol, vinylidene chloride resins, acrylic resins, polyamides, polycarbonate, fluorine resins, polyvinyl formal, polyvinyl butyral, acetyl cellulose, nitrocellulose, polyvinyl acetate, polyisobutylene, ethyl cellulose, and polyvinyl acetoacetal.

As the coloring agent, conventionally known organic pigments, inorganic pigments, organic dyes, inorganic dyes, and the like can be appropriately selected and used.

Preferable is a coloring agent that has a sufficient color density and does not discolor and fade due to light, heat, and the like.

The coloring agent may be a material that develops color by heating or a material that develops color when brought into contact with a component applied on the surface of a transfer receiving article.

The color of the coloring agent is not limited to cyan, magenta, yellow, and black, and coloring agents of various colors can be used.

(Transfer Layer)

FIGS. 2 and 3 are schematic cross-sectional views each showing an exemplary thermal transfer sheet 100 of the present disclosure. The thermal transfer sheet 100 of an embodiment shown in each of FIGS. 2 and 3 has a transfer layer 10.

The transfer layer 10 is a layer that is released from the substrate 1 side of the thermal transfer sheet and transferred onto a transfer receiving article. Transfer layer 10 can be transferred by application of energy.

An exemplary transfer layer 10 has a single-layer structure or layered structure.

An exemplary transfer layer 10 has a single-layer structure or layered structure including an exfoliate layer.

An exemplary transfer layer 10 has a single-layer structure or layered structure including a protective layer.

An exemplary transfer layer 10 has a single-layer structure or layered structure including a functional layer.

An exemplary transfer layer 10 has a layered structure including two or more of an exfoliate layer, a protective layer, and a functional layer.

As the exfoliate layer and the protective layer, layers that are conventionally known in the field of thermal transfer sheets can be appropriately selected and used.

Examples of the functional layer may include a heat seal layer, a concealing layer, a coloring layer, and an antistatic layer.

As the transfer layer 10, the transfer layer of a conventionally known intermediate transfer medium, the transfer layer of a conventionally known protective layer transfer sheet, the transfer layer of a conventionally known heat seal panel, or the like may be used.

In an exemplary thermal transfer sheet 100 of the present disclosure, a release layer (not shown) is provided between the substrate 1 and the transfer layer 10. The release layer is a layer that remains on the substrate 1 side when the transfer layer 10 is transferred.

(Transfer Receiving Article)

There is no limitation on a transfer receiving article that can be used for producing a print, and examples thereof may include a thermal transfer image-receiving sheets, paper substrates, resin substrates, wood, glass substrates, metal substrates, and ceramic substrate. The whole or a portion of a transfer receiving article may have a curvature, an uneven structure, or the like. The transfer receiving article 200 may be colored or may have transparency. The transfer receiving article may have a predetermined image formed thereon.

The transfer receiving article 200 may include a plurality of members layered.

Examples of a paper substrate may include plain paper, wood-free paper, natural fiber paper, coated paper, and tracing paper.

Examples of a resin substrate may include embodiments such as films and cards. Examples of a card may include IC cards and ID cards.

Examples of a resin substrate may include polycarbonate, acrylic resins, acrylonitrile-butadiene-styrene (ABS) resins, vinyl chloride, and vinyl chloride-vinyl acetate copolymers.

Examples of a metal substrate include aluminum.

Example of a ceramic substrate include pottery.

(Printer)

There is no limitation on a printer that can be used for producing a print, and a conventionally known printer comprising a heating device such as a thermal head can be appropriately selected and used. The thermal transfer sheet 100 of the present disclosure is particularly suitable in a case where a print is produced using a printer capable of applying high energy.

A thermal transfer sheet according to an embodiment of the present disclosure is a thermal transfer sheet in which either one or both of a colorant layer and a transfer layer are provided on one face of a substrate, and a back face layer is provided on the other face of the substrate, wherein a back face primer layer is provided between the substrate and the back face layer, and the back face primer layer contains at least one component selected from a silicone resin, a siloxane cross-linked resin, and a silica-introduced resin. The thermal transfer sheet satisfies either one or both of the following (i) and (ii).

(i) The back face primer layer contains the silicone resin, and the silicone resin is a cross-linked silicone resin.

(ii) The back face primer layer contains the siloxane cross-linked resin, and the siloxane cross-linked resin is a siloxane cross-linked acrylic resin.

EXAMPLES

Next, the present disclosure will be described more concretely with reference to examples and comparative examples. Hereinafter, unless otherwise particularly specified, the expression of part(s) or % means that by mass, representing a formulation (amount fed) not in terms of solid content.

Example 1

A coating liquid for back face primer layer 1 having the following composition was coated on one face of a substrate, and the coated liquid was dried to form a back face primer layer having a thickness of 0.4 μm. A coating liquid for back face layer 1 having the following composition was coated on the back face primer layer, and the coated liquid was dried to form a back face layer having a thickness of 0.4 μm. A coating liquid for colorant primer layer was coated on a portion of the other face of the substrate, and the coated liquid was dried to form a colorant primer layer having a thickness of 0.25 μm. A coating liquid for yellow colorant layer, a coating liquid for magenta colorant layer, and a coating liquid for cyan colorant layer having the following composition were coated on the colorant primer layer, and the coated liquids were dried to form a colorant layer in which a yellow colorant layer, a magenta colorant layer, and a cyan colorant layer each having a thickness of 0.5 μm were provided in this order in a frame-sequential manner. A coating liquid for exfoliate layer having the following composition was coated on another portion of the other face of the substrate, and the coated liquid was dried to form an exfoliate layer having a thickness of 1 μm. A coating liquid for protective layer having the following composition was coated on the exfoliate layer, and the coated liquid was dried to form a protective layer having a thickness of 2 μm, and thus a thermal transfer sheet of Example 1 was obtained.

The exfoliate layer and the protective layer constitute the transfer layer of the thermal transfer sheet of the present disclosure, and the yellow colorant layer, the magenta colorant layer, and the cyan colorant layer constitute the colorant layer of the thermal transfer sheet of the present disclosure.

A polyethylene terephthalate film having a thickness of 4.5 μm was used as a substrate.

| <Coating liquid for back face primer layer 1> | |
|---|---|
| Methylsilicone resin (solid content: 20%) | 50 parts |
| (KR-251, manufactured by Shin-Etsu Chemical Co., Ltd.) | |
| Dioctyltin-type catalyst | 0.5 parts |
| (U-830, Nitto Kasei Co., Ltd.) | |
| Methyl ethyl ketone | 25 parts |
| Toluene | 25 parts |

| <Coating liquid for back face layer 1> | |
|---|---|
| Polyvinyl acetal | 45 parts |
| (S-LEC(R) KS-1, SEKISUI CHEMICAL CO., LTD.) | |
| Polyisocyanate (solid content: 75%) | 40 parts |
| (BURNOCK(R) D750, DIC Corporation) | |
| Zinc stearyl phosphate | 20 parts |
| (LBT-1830 purified, Sakai Chemical Industry Co., Ltd.) | |
| Talc | 5 parts |
| (MICRO ACE(R) P-3, Nippon Talc Co., Ltd.) | |
| Methyl ethyl ketone | 278 parts |
| Toluene | 278 parts |

| <Coating liquid for colorant primer layer> | |
|---|---|
| Alumina sol | 4 parts |
| (Alumina sol 200, Nissan Chemical Industries, Ltd.) | |
| Cationic polyurethane | 6 parts |
| (SF-600, Dai-ichi Kogyo Seiyaku, Co., Ltd.) | |
| Water | 100 parts |
| Isopropyl alcohol | 100 parts |

| <Coating liquid for yellow colorant layer> | |
|---|---|
| Pigment represented by the following chemical formula | |
| (Y-1) | 3 parts |
| Polyvinyl acetal | 5.5 parts |
| (S-LEC(R) KS-5, SEKISUI CHEMICAL CO., LTD.) | 1 part |
| Epoxy-modified acryl resin | |
| (RESEDA(R) GP-305, Toagosei Co., Ltd.) | 0.5 parts |
| Urethane-modified silicone oil | |
| (DAIALLOMER(R) SP2105, Dainichiseika Color & | 80 parts |
| Chemicals Mfg. Co., Ltd.) | |
| Methyl ethyl ketone | |
| Toluene | 10 parts |

[Formula 2]

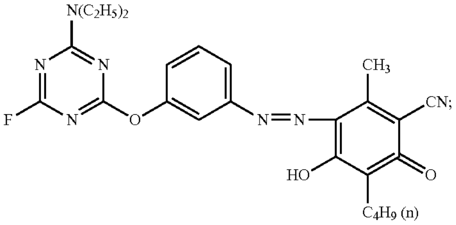

Y-1

| <Coating liquid for magenta colorant layer> | |
|---|---|
| Pigment represented by the following chemical formula | |
| (M-1) | 3 parts |
| Polyvinyl acetal | 5.5 parts |
| (S-LEC(R) KS-5, SEKISUI CHEMICAL CO., LTD.) | 1 part |
| Epoxy-modified acryl resin | |
| (RESEDA(R) GP-305, Toagosei Co., Ltd.) | 0.5 parts |
| Urethane-modified silicone oil | |
| (DAIALLOMER(R) SP2105, Dainichiseika Color & | 80 parts |
| Chemicals Mfg. Co., Ltd.) | |
| Methyl ethyl ketone | |
| Toluene | 10 parts |

[Formula 3]

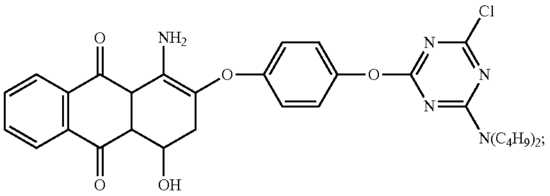

M-1

| <Coating liquid for cyan colorant layer> | |
|---|---|
| Pigment represented by the following chemical formula | |
| (C-1) | 3 parts |
| Polyvinyl acetal | 5.5 parts |
| (S-LEC(R) KS-5, SEKISUI CHEMICAL CO., LTD.) | 1 part |
| Epoxy-modified acryl resin | |
| (RESEDA(R) GP-305, Toagosei Co., Ltd.) | 0.5 parts |
| Urethane-modified silicone oil | |
| (DAIALLOMER(R) SP2105, Dainichiseika Color & | 80 parts |
| Chemicals Mfg. Co., Ltd.) | |
| Methyl ethyl ketone | |
| Toluene | 10 parts |

-continued

| <Coating liquid for cyan colorant layer> |
|---|
| [Formula 4]<br>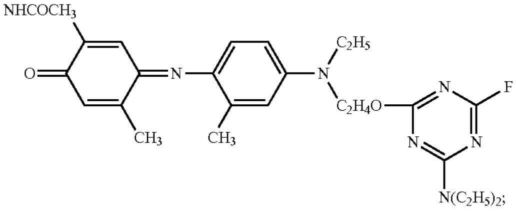<br>C-1 |

| <Coating liquid for exfoliate layer> | |
|---|---|
| Acrylic resin | 29 parts |
| (DIANAL(R) BR-87, Mitsubishi Chemical Corporation) | |
| Polyester | 1 part |
| (Vylon(R) 200, TOYOBO CO., LTD.) | |
| Methyl ethyl ketone | 35 parts |
| Toluene | 35 parts |

| <Coating liquid for protective layer> | |
|---|---|
| Polyester | 30 part |
| (Vylon(R) 200, TOYOBO CO., LTD.) | |
| Methyl ethyl ketone | 35 parts |
| Toluene | 35 parts |

Example 2

A thermal transfer sheet of Example 2 was obtained exactly in the same manner as in Example 1 except that the coating liquid for back face primer layer 1 was replaced by a coating liquid for back face primer layer 2 having the following composition to form the back face primer layer.

| <Coating liquid for back face primer layer 2> | |
|---|---|
| Methylphenylsilicone resin (solid content: 50%) | 20 parts |
| (KR-300, manufactured by Shin-Etsu Chemical Co., Ltd.) | |
| Dioctyltin-type catalyst | 0.5 parts |
| (U-830, Nitto Kasei Co., Ltd.) | |
| Methyl ethyl ketone | 40 parts |
| Toluene | 40 parts |

Example 3

A thermal transfer sheet of Example 3 was obtained exactly in the same manner as in Example 1 except that the coating liquid for back face primer layer 1 was replaced by a coating liquid for back face primer layer 3 having the following composition to form the back face primer layer.

| <Coating liquid for back face primer layer 3> | |
|---|---|
| Epoxy resin-modified silicone resin (solid content: 60%) | 17 parts |
| (ES-1002T, manufactured by Shin-Etsu Chemical Co., Ltd.) | |
| Dioctyltin-type catalyst | 0.5 parts |
| (U-830, Nitto Kasei Co., Ltd.) | |

-continued

| <Coating liquid for back face primer layer 3> | |
|---|---|
| Methyl ethyl ketone | 41.5 parts |
| Toluene | 41.5 parts |

Example 4

A thermal transfer sheet of Example 4 was obtained exactly in the same manner as in Example 1 except that the coating liquid for back face primer layer 1 was replaced by a coating liquid for back face primer layer 4 having the following composition to form the back face primer layer.

| <Coating liquid for back face primer layer 4> | |
|---|---|
| Silica-introduced epoxy resin (solid content: 50%) | 20 parts |
| (E-103D, Arakawa Chemical Industries, Ltd.) | |
| Dioctyltin-type catalyst | 0.5 parts |
| (U-830, Nitto Kasei Co., Ltd.) | |
| Methyl ethyl ketone | 40 parts |
| Toluene | 40 parts |

Example 5

A thermal transfer sheet of Example 5 was obtained exactly in the same manner as in Example 1 except that the coating liquid for back face primer layer 1 was replaced by a coating liquid for back face primer layer 5 having the following composition to form the back face primer layer.

| <Coating liquid for back face primer layer 5> | |
|---|---|
| Alkoxysilyl group-containing acrylic resin (solid content: 50%) | 20 parts |
| (8SQ-1020, Taisei Fine Chemical Co., Ltd.) | |
| Dioctyltin-type catalyst | 0.5 parts |
| (U-830, Nitto Kasei Co., Ltd.) | |
| Methyl ethyl ketone | 40 parts |
| Toluene | 40 parts |

Example 6

A thermal transfer sheet of Example 6 was obtained exactly in the same manner as in Example 1 except that the coating liquid for back face layer 1 was replaced by a coating liquid for back face layer 2 having the following composition to form the back face layer.

| <Coating liquid for back face layer 2> | |
|---|---|
| Acrylic resin | 75 parts |
| (DIANAL(R) BR-80, Mitsubishi Chemical Corporation) | |
| Zinc stearyl phosphate | 20 parts |
| (LBT-1830 purified, Sakai Chemical Industry Co., Ltd.) | |
| Talc | 5 parts |
| (MICRO ACE(R) P-3, Nippon Talc Co., Ltd.) | |
| Methyl ethyl ketone | 283 parts |
| Toluene | 283 parts |

Example 7

A thermal transfer sheet of Example 7 was obtained exactly in the same manner as in Example 1 except that the coating liquid for back face layer 1 was replaced by a coating liquid for back face layer 3 having the following composition to form the back face layer.

| <Coating liquid for back face layer 3> | |
|---|---|
| Alkoxysilyl group-containing acrylic resin (solid content: 50%) | 150 parts |
| (8SQ-1020, Taisei Fine Chemical Co., Ltd.) | |
| Dioctyltin-type catalyst | 3.8 parts |
| (U-830, Nitto Kasei Co., Ltd.) | |
| Zinc stearyl phosphate | 20 parts |
| (LBT-1830 purified, Sakai Chemical Industry Co., Ltd.) | |
| Talc | 5 parts |
| (MICRO ACE(R) P-3, Nippon Talc Co., Ltd.) | |
| Methyl ethyl ketone | 244 parts |
| Toluene | 244 parts |

Comparative Example 1

A thermal transfer sheet of Comparative Example 1 was obtained exactly in the same manner as in Example 1 except that the coating liquid for back face primer layer 1 was replaced by a coating liquid for back face primer layer A having the following composition to form the back face primer layer.

| <Coating liquid for back face primer layer A> | |
|---|---|
| Polyester (solid content: 20%) | 50 parts |
| (WR-905, The Nippon Synthetic Chemical Industry Co., Ltd. ) | |
| Water | 25 parts |
| Isopropyl alcohol | 25 parts |

Comparative Example 2

A thermal transfer sheet of Comparative Example 2 was obtained exactly in the same manner as in Example 1 except that the coating liquid for back face primer layer 1 was replaced by a coating liquid for back face primer layer B having the following composition to form the back face primer layer.

| <Coating liquid for back face primer layer B> | |
|---|---|
| Polyvinyl alcohol | 10 parts |
| (GM-14R, The Nippon Synthetic Chemical Industry Co., Ltd.) | |
| Water | 45 parts |
| Isopropyl alcohol | 45 parts |

(Printing Suitability Evaluation 1 (Printing Wrinkle and Breakage))

A sublimable-type thermal transfer printer (DS40, Dai Nippon Printing Co., Ltd.), a genuine image receiving paper for the sublimable-type thermal transfer printer as a transfer receiving article, and the thermal transfer sheet of each of Examples and Comparative Examples were used to form a black solid image (image gray scale: 0/255) on the transfer receiving article using each colorant layer under an 0° C. environment. Printing by transferring the transfer layer onto this image was conducted 10 times to obtain 10 prints. The printing suitability at this time was evaluated based on the following evaluation criteria. The evaluation results are shown in Table 1.

A: No printing wrinkle has occurred in any of the 10 prints.

B: A small printing wrinkle has occurred in one or more of the prints, but there is no problem in practical use.

NG (1): A large printing wrinkle has occurred in one or more prints.

NG (2): Breakage occurred during printing, and the printing was interrupted.

(Printing Suitability Evaluation 2 (Printing Unevenness))

A sublimable-type thermal transfer printer (DS40, Dai Nippon Printing Co., Ltd.), a genuine image receiving paper for the sublimable-type thermal transfer printer as a transfer receiving article, and the thermal transfer sheet of each of Examples and Comparative Examples were used to form a gray image (image gray scale: 75/255) on the transfer receiving article using each colorant layer under an 0° C. environment. Printing by transferring the transfer layer onto this image was conducted 10 times to obtain 10 prints. The printing suitability at this time was evaluated based on the following evaluation criteria. The evaluation results are shown in Table 1.

A: No printing unevenness has occurred in any of the 10 prints.

B: Slight printing unevenness visually observable has partially occurred in one or more prints, but there is no problem in practical use.

NG (1): Printing unevenness visually appreciable has partially occurred in one or more prints.

NG (2): Printing unevenness visually appreciable has entirely occurred in one or more prints.

(Printing Suitability Evaluation 3 (Adherence of Shavings and Scratch))

A sublimable-type thermal transfer printer (DS40, Dai Nippon Printing Co., Ltd.), a genuine image receiving paper for the sublimable-type thermal transfer printer as a transfer receiving article, and the thermal transfer sheet of each of Examples and Comparative Examples were used to form a natural image on the transfer receiving article using each colorant layer under an 0° C. environment. Printing by transferring the transfer layer onto this image was conducted 500 times to obtain 500 prints. The printing suitability at this time was evaluated based on the following evaluation criteria. The evaluation results are shown in Table 1.

A: No scratch has occurred in any of the prints, and no shaving has adhered to the thermal head.

B: No scratch has occurred in any of the prints, but a few shavings have adhered to the thermal head.

NG (1): A scratch has occurred in one or more of the prints, and shavings have adhered to the thermal head.

NG (2): A large scratch has occurred in one or more of the prints, and many shavings have adhered to the thermal head.

(Measurement of Storage Elastic Modulus G')

The method for measuring a storage elastic modulus G' described above was used to measure the storage elastic modulus G' at 200° C. of the back face primer layer in the thermal transfer sheet of each of Examples and Comparative Examples. A specimen was formed by coating each coating liquid for back face primer layer and drying the coated liquid. The thickness of the specimen was 2.0 mm. The storage elastic modulus G' at 200° C. of the back face primer layer of the thermal transfer sheet was $1.0\times10^9$ Pa or more in all of Examples 1 to 7, and the storage elastic modulus G' at 200° C. of the back face primer layer of the thermal transfer sheet was $1.0\times10^5$ Pa or less in both of Comparative Examples 1 and 2.

TABLE 1

| | Printing suitability evaluation | | |
|---|---|---|---|
| | (1) Printing wrinkle and breakage | (2) Printing unevenness | (3) Adherence of shavings and scratch |
| Example 1 | A | A | A |
| Example 2 | A | A | A |
| Example 3 | B | B | A |
| Example 4 | B | B | A |
| Example 5 | B | B | A |
| Example 6 | A | B | B |
| Example 7 | A | A | A |
| Comparative Example 1 | NG(2) | NG(2) | NG(2) |
| Comparative Example 2 | NG(2) | NG(1) | NG(2) |

REFERENCE SIGNS LIST

1 Substrate

3, 3Y, 3M, 3C Colorant layer

10 Transfer layer

20 Back face layer

25 Back face primer layer

100 Thermal transfer sheet

The invention claimed is:

1. A thermal transfer sheet in which either one or both of a colorant layer and a transfer layer are provided on one face of a substrate, and a back face layer is provided on an opposing face of the substrate, wherein a back face primer layer is provided between the substrate and the back face layer, and wherein the back face primer layer contains a siloxane cross-linked acrylic resin and a cross-linked silicone resin.

* * * * *